United States Patent
Olson et al.

(10) Patent No.: US 8,224,814 B2
(45) Date of Patent: Jul. 17, 2012

(54) METHODS AND SYSTEMS FOR INTERMINGLING HETERGENEOUS LISTING TYPES WHEN PRESENTING SEARCH RESULTS

(75) Inventors: James Matthew Olson, San Jose, CA (US); Ken Sun, Palo Alto, CA (US); Suchisubhra Sinha, San Jose, CA (US); Rangaraj Keshavamurthy Belur, San Jose, CA (US)

(73) Assignee: eBay Inc., San Jose, CA (US)

( * ) Notice: Subject to any disclaimer, the term of this patent is extended or adjusted under 35 U.S.C. 154(b) by 337 days.

(21) Appl. No.: 12/578,560

(22) Filed: Oct. 13, 2009

(65) Prior Publication Data

US 2011/0087654 A1    Apr. 14, 2011

(51) Int. Cl.
*G06F 7/00* (2006.01)
(52) U.S. Cl. .................................................. 707/723
(58) Field of Classification Search .................. 707/722, 707/723
See application file for complete search history.

(56) References Cited

U.S. PATENT DOCUMENTS

| | | | |
|---|---|---|---|
| 6,647,383 B1* | 11/2003 | August et al. | 1/1 |
| 2008/0091757 A1* | 4/2008 | Ingrassia et al. | 708/490 |
| 2010/0293034 A1* | 11/2010 | Olejniczak et al. | 705/10 |
| 2011/0047166 A1* | 2/2011 | Stading et al. | 707/749 |
| 2011/0082848 A1* | 4/2011 | Goldentouch | 707/706 |

* cited by examiner

*Primary Examiner* — Angela Lie
(74) *Attorney, Agent, or Firm* — Schwegman, Lundberg & Woessner, P.A.

(57) ABSTRACT

The present disclosure relates to methods and systems for managing how merchandise listings satisfying a search query are processed and presented to a user of a computer-based trading or e-commerce application when the listings are of heterogeneous types. Consistent with some embodiments, in response to a user-initiated search query, item listings and product listings are displayed intermingled in a set of search results pages. The item listings and product listings are positioned relative to one another, in part, based on a level of demand associated with the product listings and the item listings, where demand is measured by monitoring user-initiated activities in connection with the item and product listings.

13 Claims, 8 Drawing Sheets

METHODS AND SYSTEMS FOR INTERMINGLING HETERGENEOUS LISTING TYPES WHEN PRESENTING SEARCH RESULTS

TECHNICAL FIELD

The present disclosure generally relates to data processing techniques. More specifically, the present disclosure relates to methods and systems for managing how merchandise listings satisfying a search query are processed and presented to a user of a computer-based trading or e-commerce application when the listings are of heterogeneous types.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come into existence. The business models utilized by enterprises operating online are almost as varied as the merchandise and services being offered. For instance, some merchandise and services are offered at fixed prices, while others are offered via various auction methods, and still others are offered via a system of classified ad listings. Some enterprises specialize in the selling of a specific type of merchandise (e.g., books) or a specific service (e.g., tax preparation), while others provide a myriad of categories of merchandise and services from which to choose. Some enterprises sell directly to consumers while others serve only as an intermediary, connecting sellers and buyers. Despite the many technical advances that have improved the state of e-commerce, a great number of technical challenges and problems remain.

One such problem involves determining how to best present search results (e.g., merchandise listings, web pages, advertisements) in the search results page (or pages), when the search results have heterogeneous types. For example, the search results may include merchandise listings being offered via auctions, as well as merchandise listings being offered at fixed prices. In this context, the type of the listing is the price mechanism used to offer the item for sale. In some instances, the merchandise listings may have different sources. For example, some merchandise listings may be classified ad listings retrieved from a first source, such as a web site dedicated to classified ad listings, while other merchandise listings may be retrieved from a different online source, such as specialty retail web sites. In this context, the type of listing depends on the source of the listing. In yet another example of different listing types, in some instances, some of the merchandise listings will be for unique items for which there is no matching product in a product catalog maintained by the e-commerce system, while other merchandise listings will be for products, for example, selected from a catalog of products maintained by the e-commerce system.

When these scenarios arise, it can often be difficult to determine how best to position the different types of search results with respect to one another in the search results page (or, pages). One of the reasons it may be difficult to mix the search results and present them in the search results page (or, pages) in an intermingled manner is that the data used to rank or rate the individual listings may not be available for one or the other listings types. In some instances, because of a different ranking algorithm for ranking the two different listing types, the data used for ranking a first listing type may be different from the data used in ranking the second listing type. Accordingly, a fair comparison of the relative quality of two different listings having different listing types may not be readily available.

A particular instance of this problem occurs with item listings and product listings displayed in the search results pages of an e-commerce platform that serves as intermediary connecting sellers with buyers. For instance, some of the merchandise listings generated by the sellers may be for unique items with unique attributes (e.g., color, size, features, and so forth), while other items may match a known product in a catalog system of the e-commerce platform. Accordingly, when a seller is listing a unique item for which there is no match in the e-commerce platform's product catalog, the seller must provide all of the item attribute information including a photograph of the item. When the seller is listing an item known to match an existing product from the catalog, the seller can simply specify the product and the e-commerce platform can automatically provide the product attributes for the listing, including a stock photo for the product. When presenting search results for a particular user-initiated search, the search results may contain merchandise listings for unique items not associated with any particular product, referred to herein as item listings, and merchandise listings that are associated with particular products, referred to herein as product listings.

Just as product placement in a retail store can greatly affect the level of sales for a particular product, in the e-commerce context, it is well known that merchandise listings that appear in the most prominent positions of a search results page will have a greater conversion rate. Accordingly, it is common for e-commerce platforms to utilize ranking or ordering algorithms in conjunction with search engines in an attempt to position the best merchandise in the most prominent positions (e.g., typically, the top of a list) of the search results pages. One way this is achieved is to monitor user activities associated with merchandise listings, and use certain activities as a proxy for demand. For example, if a particular merchandise listing is frequently selected (e.g., clicked on) when presented in the search results pages, this may indicate that the merchandise listing is a highly sought after item, and therefore should be presented prominently in the search results. However, when the volume of unique item listings being managed by the e-commerce platform reaches a certain threshold, it becomes extremely difficult and cost prohibitive to monitor and store the information required to assess the demand (based on user activity) of every unique item listing. Consequently, when the listings are of two different types, such as product listings and item listings, applying a uniform scoring and ranking algorithm to determine the order in which the listings should be presented in a set of search results pages becomes a non-trivial task.

DESCRIPTION OF THE DRAWINGS

Some embodiments are illustrated by way of example and not limitation in the figures of the accompanying drawings, in which.

DETAILED DESCRIPTION

Figure 1:
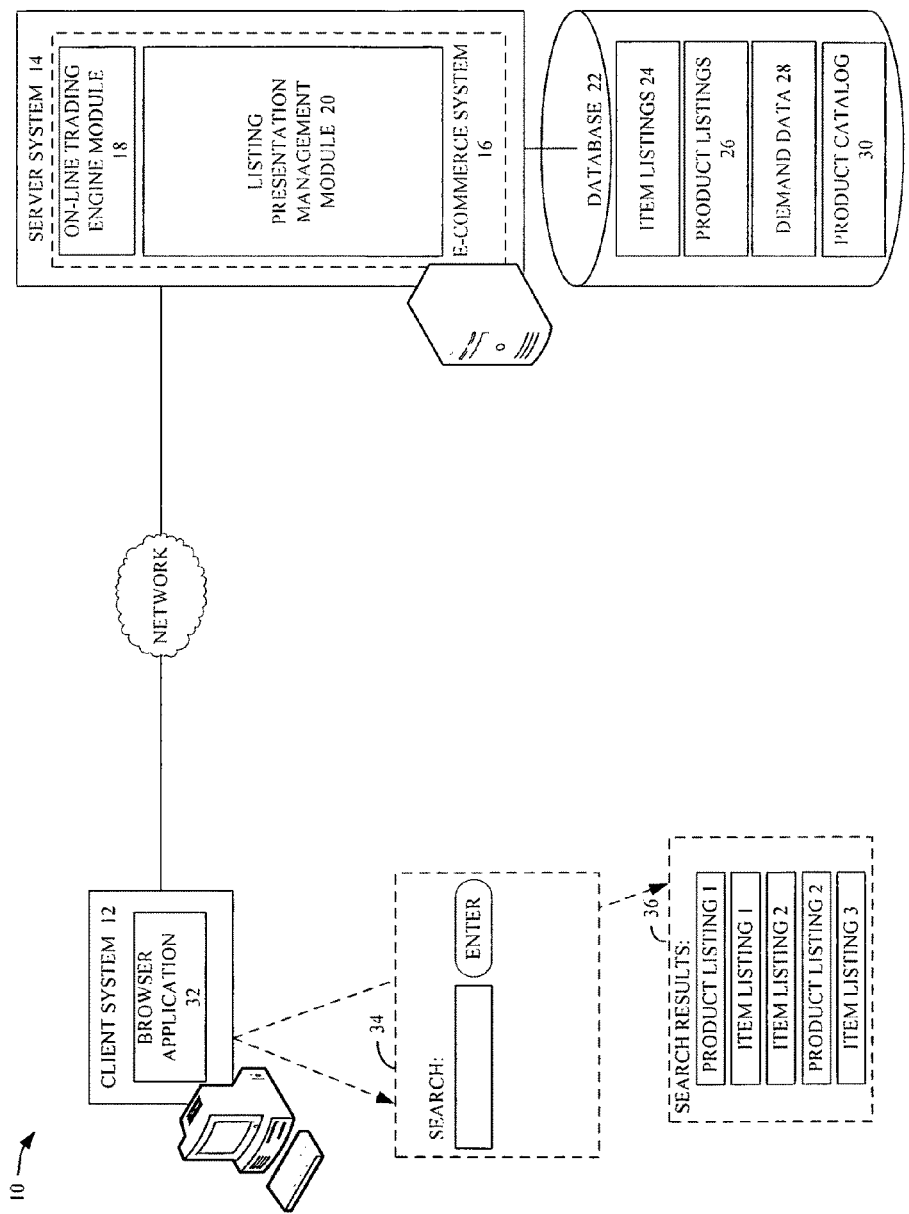
FIG. 1 is a block diagram of a network environment including a network-connected client system and server system, with which an embodiment of the invention might be implemented.

Methods and systems for managing how merchandise listings satisfying a search query are processed and presented to a user of a computer-based trading or e-commerce application, when the merchandise listings have heterogeneous listing types, are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Embodiments of the invention provide a mechanism for intermingling search results that have differing types, such that the algorithms and/or underlying data used in ranking or rating the respective types of search results may differ, thereby making it difficult to make a comparison of the two different types of search results for purposes of establishing their positions relative to one another in a search results page (or, pages). Throughout the present disclosure, embodiments of the invention are described in the context of an e-commerce system that provides search results containing item listings and product listings intermingled with one another. However, those skilled in the art will readily appreciate other applications of the inventive subject matter, including the intermingling of search results other than merchandise listings, and the intermingling of merchandise listings that have types other than item listings and product listings.

As used herein, the term "product listing" is meant to refer to a merchandise listing for an item that is part of a catalog of products known to, and supported by, an e-commerce system. For example, when a seller is generating a merchandise listing for an item to be offered via an e-commerce system, the e-commerce system may prompt the user to select, from a catalog of products maintained by the e-commerce system, the exact product that the seller is offering for sale via the listing. Assuming the seller's item is within the catalog of products maintained at the e-commerce system, the seller can select the exact product that matches the seller's item, and the e-commerce system will automatically populate some of the attribute fields that describe the item being offered via the listing.

In contrast, the term "item listing" is used herein to refer to merchandise listings for which there is no matching product in a catalog of products maintained at the e-commerce system. For example, unique and rare items, such as antiques and hand crafted items, will typically not match any products in a products catalog maintained by the e-commerce system. Accordingly, when a seller is offering a unique item for sale via a merchandise listing, the seller must provide all of the information for the attribute fields to properly describe the item being offered for sale. In some instances, a merchandise listing may be an item listing simply because the seller has failed to properly select a product from the product catalog of the e-commerce system. In any case, an item listing will not have a link or reference to a product in a catalog of products maintained by the e-commerce system.

As described in greater detail below, an e-commerce system consistent with an embodiment of the invention includes a listing presentation management module that intermingles product listings and item listings in the search results pages displayed to the user, such that the product listings and item listings are positioned relative to one another based on a measure of demand for the respective item and product listings, where the measure of demand is derived based on an analysis of prior user-initiated activities or interactions detected with the item and product listings. For example, the prior user-initiated activities or interactions are used as a proxy to assess the level of demand for the various merchandise associated with the product and item listings.

The particular user-initiated activities that are taken into consideration when assessing demand may vary from one embodiment to the next. However, in some embodiments, the particular events or activities used as a proxy for demand include: item or product views (Views), the number of bids associated with a listing (Bids), the number of fixed-price purchases made for a particular listing (Buy it Now, "Bins"), and/or the number of times a user adds an item to a watch list to monitor the item (Watch List). For example, a view event occurs when a user selects a particular product or item listing from a search results page to view the details of the item listing, for example, in a View Item page, or to view the particular productized merchandise listings that have been grouped into a product display page. A bid is an event that occurs when a user places a bid on an item listing that is available by way of an active auction. Some listings are multi-item listings, and as such, the number of items sold for the listing can be tracked. A bin is an event that occurs when a user purchases an item at a fixed price, using functionality referred to generally as a "Buy it Now" feature. If a user wants to monitor a particular item listing, for example, to observe whether the price changes, or at what price an auction-based item actually sells, the user can add the item listing to a watch list. In other embodiments, the demand data may be derived by monitoring or analyzing other types of data associated with the search results being presented.

The data derived from detecting and storing these user-initiated events is collectively referred to herein as demand data. Using these user-initiated activities or events as a proxy for demand, the e-commerce system can determine the total demand for a particular query and in some instances the demand for each particular product listing. For instance, the total demand for a query may be a weighted sum of all of the user-initiated events (e.g., views, bids, bins and watches) associated with the product listings and item listings that satisfy the query. Similarly, the total demand for each product listing may be the sum of user-initiated events associated with that product listing. In some instances, it may be cost prohibitive to track and store user-initiated events on a per item listing basis. Accordingly, in some embodiments, the measure of demand (e.g., the activities/events count) for item listings may only be known in the aggregate. For instance, if the total activity count for a particular query is known (e.g., the query demand), and the total activity count for each product listing satisfying the query is known (e.g., the total product demand), it follows that the total activity count for all item listings is simply the total count for the query, less the total count for the product listings. Stated differently, the aggregate item demand is simply the total query demand less the total product demand. As described in greater detail below, by allocating units of item demand to each listing slot (e.g., a position in the search results page for displaying a particular listing) in the search results page (or pages) according to the percent of purchases that each slot represents, based on a historical analysis of purchases, the e-commerce system can designate the listing slots to be used for displaying an item listing or a product listing based on the relative level of demand for the product listings and item listings.

FIG. 1 is a block diagram of a network environment 10 including a network-connected client system 12 and server system 14, with which an embodiment of the invention might be implemented. As illustrated in FIG. 1, the server system 14 is shown to include an e-commerce system or platform 16. In this example, the e-commerce system 16 is comprised of two primary modules—an on-line trading engine module 18, and a listing presentation management module 20.

In some embodiments, the on-line trading engine module 18 may consist of a variety of sub-components or modules, which provide some of the functions of an on-line trading application. As described more completely below, each module may be comprised of software instructions, computer hardware components, or a combination of both. To avoid obscuring the invention in unnecessary detail, only a few of the many on-line trading engine functions (which are germane to conveying an understanding of the invention) are described herein. For example, the on-line trading engine module 18 may include a listing management module (not shown) that facilitates the receiving and storing of data representing item attributes, which collectively form an item listing. When a seller desires to list a single item, or multiple items, for sale, the seller will provide information about the item(s) (e.g., item attributes). Such information may be submitted via one or more forms of one or more web pages, or via drop down lists, or similar user interface elements. The item listing management module receives the item attributes and stores the item attributes together within a database 22 as an item listing. In some instances, the item listings may be stored in an item listings database table 24.

In addition to generating item listings, in some embodiments, the listing management module may enable a seller to select a product from a catalog of products 30 maintained at the e-commerce system. By selecting a product, the seller can quickly generate a productized merchandise listing without providing customized or personalized attributes to describe the item. For example, if a seller who is interested in selling a computer monitor selects a specific model of computer monitor from the catalog of products 30 presented by the e-commerce platform, a listing for the computer monitor will automatically be generated and populated with data describing the monitor's various features, such as the manufacturer, the model, technical features, and so forth. In such a scenario, the seller need only provide certain information such as a price for the item, a shipping method and price, and a pricing mechanism (e.g., fixed price or auction). The resulting merchandise listing is said to be a productized merchandise listing, because it is linked with or includes a reference to a product in the product catalog 30.

Figure 2:
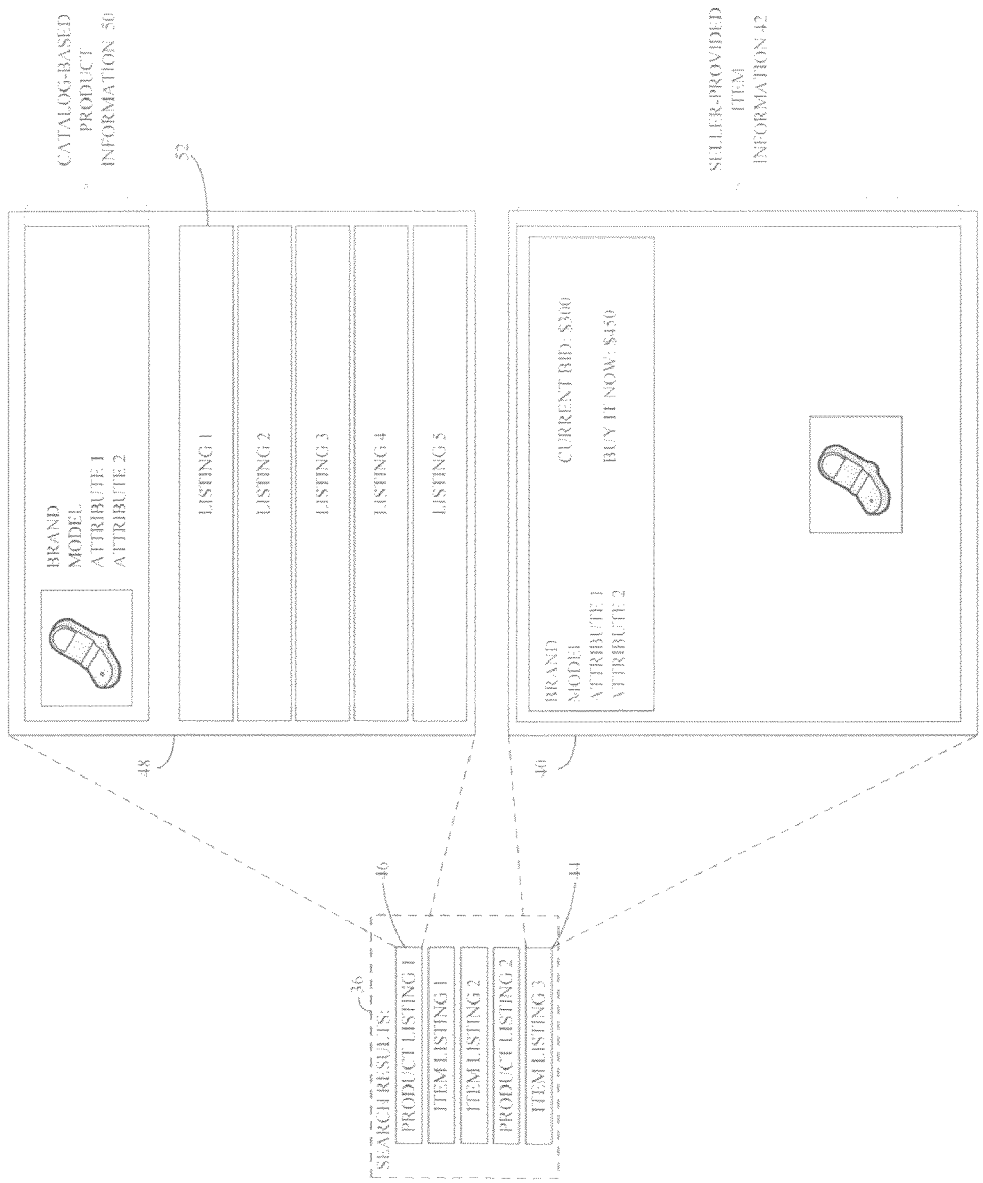
FIG. 2 is a block diagram illustrating an example of a search results page with product listings and item listings intermingled, according to an embodiment of the invention.

The on-line trading engine module 18 may also include one or more modules for monitoring user-initiated activities that can be used as a proxy for measuring the demand associated with a particular query and product. For instance, in some embodiments, data associated with user-initiated activities are analyzed and captured for the purpose of assessing the level of demand associated with certain products and/or items. If a user submits a search request including certain search terms, and then proceeds to conclude a transaction for a particular item (e.g., purchases the item), information from the user's interaction with the e-commerce system will be captured and stored for the purpose of predicting future actions by other users. Accordingly, in some embodiments, for each unique query received and processed by the e-commerce system, the e-commerce system determines the total demand for the query, by tracking views, bids, bins and watch lists associated with item listings and product listings. Similarly, user-initiated activities may be monitored to determine a total amount of demand for certain categories of merchandise. This is useful for those situations when a potential buyer browses the available merchandise by selecting categories, as opposed to submitting search terms for a search query. As illustrated in FIG. 2, this data is referred to herein as demand data 28, and is stored in the database 22.

Figure 3:
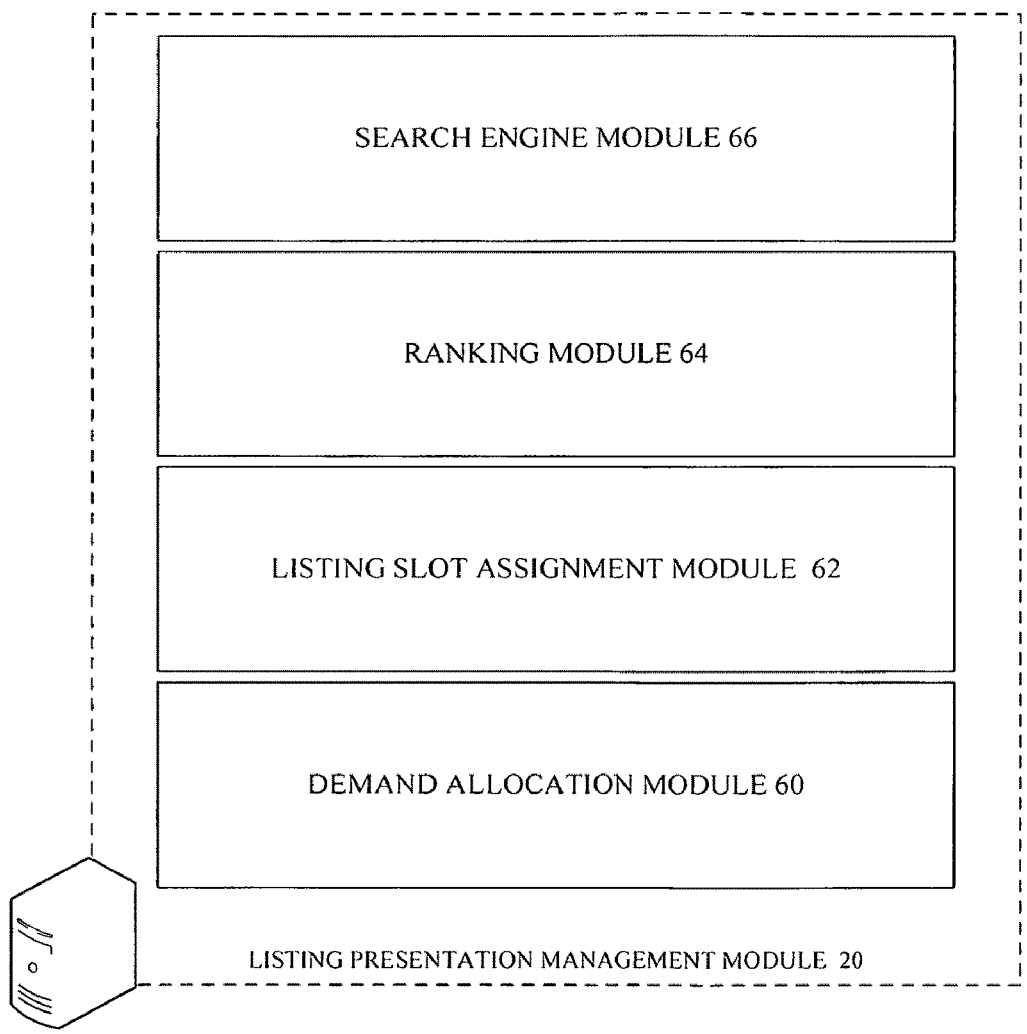
FIG. 3 is a block diagram showing the functional modules that comprise a listing presentation management module, according to an embodiment of the invention.

Referring again to FIG. 1, the second primary module of the e-commerce system 16 is a listing presentation management module 20. The listing presentation management module 20, which is described more completely in connection with the description of FIG. 3, provides the logic used to allocate units of demand to the listing slots (e.g., the individual listing positions in a search results page) to determine whether, for a particular query, a particular listing slot should be a product listing or an item listing. Once each listing slot for a query has been designated for use in displaying an item listing or a product listing, the item listings and product listings are simply positioned or placed, based on a ranking score (e.g., a best match score, or listing performance score), such that the highest ranking item listing is positioned in the first available listing slot designated for displaying an item listing, and the highest ranking product listing is positioned in the first available listing slot designated for displaying a product listing. This is of course repeated with the second highest ranking item listing and product listing, until all listings have been assigned to a listing slot.

In some embodiments, a user operates a web browser application 32 on a client system 12 to interact with the on-line trading application residing and executing on the server system 14. As illustrated by the example user interface with reference number 34, a user may be presented with a search interface 34, with which the user can specify one or more search terms to be used in a search request submitted to the on-line trading application 16. In some embodiments, in addition to specifying search terms, users may be able to select certain item attributes, such as the desired color of an item, the item categories that are to be searched, and so on. After receiving and processing the search request, the on-line trading application 16 communicates a response to the web browser application 32 on the client system 12. For instance, the response is an Internet document or web page that, when rendered by the browser application 32, displays a search results page 36 showing several item listings and product listings that satisfy the user's search request. As illustrated in the example search results page 36 of FIG. 1, the item listings and product listings are arranged or positioned on the search results page intermingled amongst one another. This intermingling is based in part on an analysis of the relative demand for item listings and product listings for a particular search query. For example, the actual number of product listings and item listings that appear on a particular page of the search results pages is dependent upon an analysis of demand. The actual order of item listings relative to other item listings is determined based on a ranking score (e.g., a listing performance score) assigned to each item listing. Similarly, the order of the product listings relative to one another is determined based on an analysis of ranking scores assigned to the product listings. The intermingling algorithm ensures that certain search queries, such as search queries for antiques and other rare one of a kind items, will result in fewer product listings and more item listings appearing in the best listing slots. Similarly, certain search queries are likely to result in search results that contain a higher percentage of product listings.

In some embodiments, the demand data for a particular query is analyzed to determine which listing slots on a particular page of the search results pages should be designated for displaying a product listing or item listing. The analysis involves allocating units of demand according to a percent of purchases that each slot represents, based on a historical analysis of purchases. In some embodiments, a formula or equation might be used to estimate the observed trend of purchases relative to slot and page positions. For example, in some embodiments, demand is allocated according to a deceleration or decay formula, or on a power law formula. Once the individual listing slots have been designated for use in displaying a product listing or item listing, the highest ranking item listing is assigned to the first listing slot designated for displaying an item listing, while the highest ranking product listing is positioned in the first listing slot designated for use in displaying a product listing. The ranking scores for the various item listings and product listings may be derived using another algorithm or algorithms, such as those described in related U.S. patent application Ser. No. 12/476,046, with title, "Methods and Systems for Deriving a Score with which Item Listings are Ordered when Presented in Search Results," filed on Jun. 1, 2009, which is incorporated herein by reference.

FIG. 2 is a block diagram illustrating an example of a search results page 36 with product listings and item listings intermingled, according to an embodiment of the invention. Consistent with embodiments of the invention, when a potential buyer executes a search query, a set of search results returned to the potential buyer will include product listings as well as item listings intermingled amongst one another, and ordered based on a ranking score. If the potential buyer selects from the search results an item listing, the buyer will be presented with an item view page, such as the example item view page 40 in FIG. 2, which shows all of the seller-provided information 42 about the item being offered for sale via the item listing 44. If the potential buyer selects a product listing 46 from the search results page 36, a product display page 48 will be presented to the potential buyer. The product display page 48 will include catalog-based information 50 about the particular product, as well as several productized merchandise listings (e.g., listing 1 with reference number 52) for individual items matching the product. Accordingly, the potential buyer can confirm that the product is of interest, and then select a particular listing from the several listings displayed in the product detail page 48.

In some embodiments, the particular merchandise listings that are productized listings—that is, listings that are associated with a particular product in the catalog of products—will not be individually displayed in the search results pages 36. Instead, all productized listings (e.g., listing 1 with reference number 52 in FIG. 2) will be consolidated into a single product listing, such as the product listing with reference number 46 in FIG. 2. In alternative embodiments, productized listings may be shown as individual listings in the search results pages, as well as listings on a product details page 48 associated with a product listing 46 in the search results page 36.

FIG. 3 is a block diagram showing the functional modules that comprise a listing presentation management module 20, according to an embodiment of the invention. As illustrated in FIG. 3, the listing presentation management module 20 includes a demand allocation module 60, a listing slot assignment module 62, a ranking module 64, and a search engine module 66.

When processing a search query, the search engine module 66 first identifies the various item listings and product listings that satisfy the search query. This may involve comparing the keywords specified in the search query with a title or description for the item listings and product listings. Similarly, when a potential buyer is browsing for an item, for example, by selecting various categories and sub-categories, for each category selection, a set of item listings and product listings associated with the selected category are identified. The item listings and product listings that satisfy a search query, or category selection, are referred to as the search result set.

In some embodiments, once the search result set has been identified, the demand allocation module 60 determines the total demand for the user-initiated query, and the demand for each product listing satisfying the query. In some embodiments, the demand data for a query is pre-calculated on a periodic basis (e.g., weekly) such that determining the total query demand and the demand for each product listing is a simple table look-up operation. Based on the total demand for the query, and the demand for each product listing, the demand allocation module 60 can derive an aggregate demand for all item listings that satisfy the query. For example, in FIG. 4, an example search query 70 is shown. In this example, the search query is "iPod 8GB." As indicated by the box with reference number 72, the total demand for the query is shown to be one hundred, meaning that one hundred user-initiated events or activities have been detected in connection with the item and product listings that satisfy the query. In this example, there are three product listings (e.g., listings with reference numbers 74, 76 and 78) that satisfy the query. Product listing 1, with reference number 74, has a demand score of fifteen, whereas product listing 2, with reference number 76, has a demand score of eight. Finally, product listing 3, with reference number 78, has a demand score of two, thereby resulting in a total demand score for product listings of twenty-five. To derive the aggregate demand score for items, the total demand for all product listings (e.g., twenty-five) is subtracted from the total demand for the query (e.g., one-hundred). In this example, the aggregate item demand score is seventy-five, as indicated by the box with reference number 80.

Referring again to FIG. 3, in some embodiments, the demand allocation module 60 allocates the aggregate item demand (e.g., box with reference number 80 in FIG. 4) to the individual pages, and listings slots, in the search results pages, based on the percent of purchases that each page (and listing slot) represents according to an historical analysis of purchases. For example, referring to FIG. 5, a chart is shown displaying the percentage of purchases that occur as a result of item listings displayed on pages of the search results pages. For example, based on an historical analysis, it can be seen from the chart in FIG. 5 that approximately eighty percent of all purchases result from item or product listings displayed in the first page of a set of search results pages, whereas the second page of search results is accountable for approximately fifteen percent of all purchases, and the third page is accountable for approximately five percent of purchases. Of course, the chart in FIG. 5 is presented as an example, and actual observed data may not only be different, but may change over time. In some embodiments, a first algorithm may be used to allocate a certain percentage of item demand to a first portion of search pages, while a second (different) algorithm is used to allocate the remaining portion of item demand to the remaining pages that make up the search results pages. In some embodiments, the values used to allocate the portions of item demand data to the respective pages in the search results may be configurable, such that an administrator of the system can simply modify a configuration setting to utilize a different set of numbers for performing the allocation operation. Furthermore, one or more formulas or equations may be used to approximate the actual observed data. Moreover, in some embodiments, where the e-commerce platform serves as a back-end service to multiple web sites, the numbers used to allocate item demand may be configurable on a per web site basis.

Figure 4:
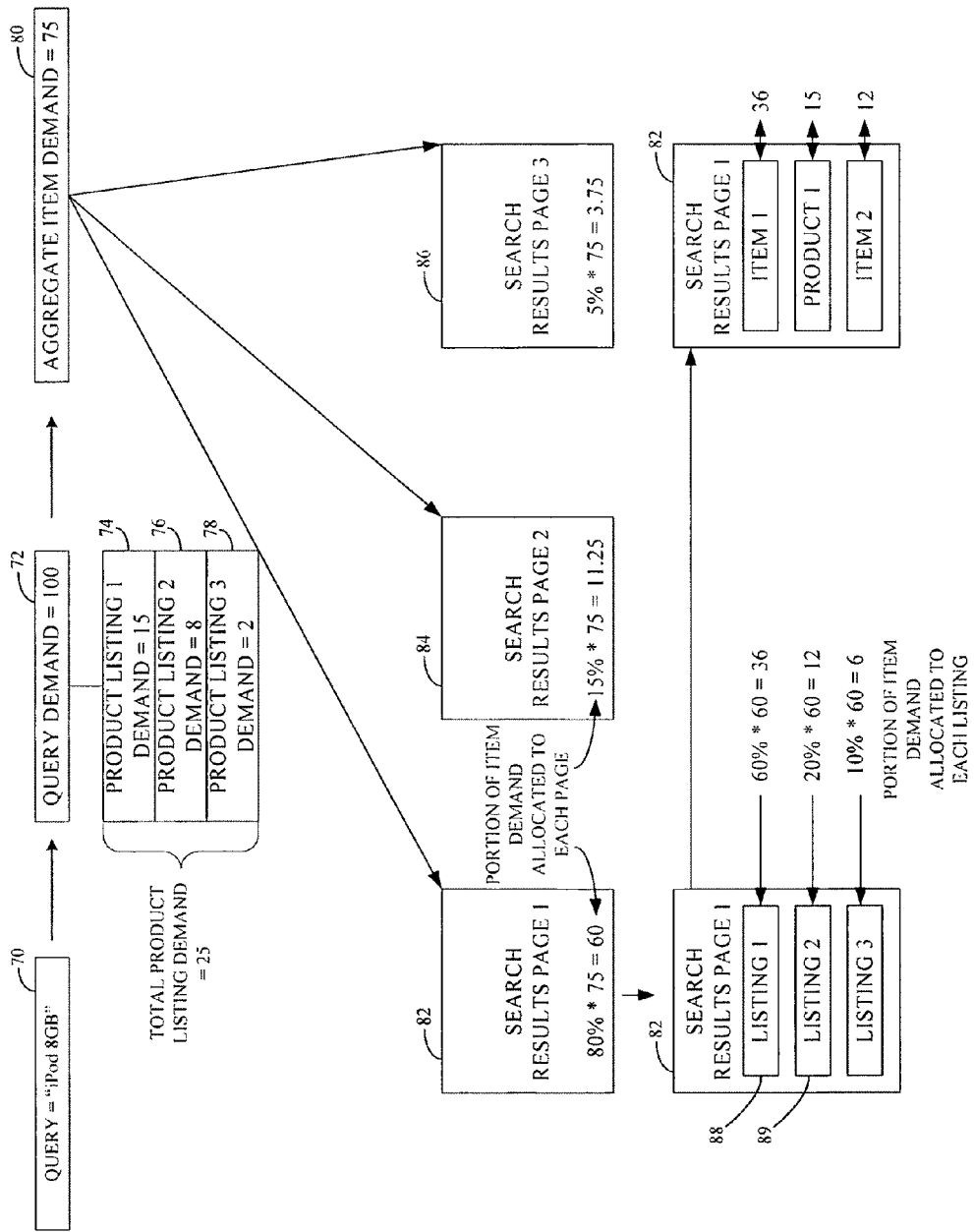
FIG. 4 is a block diagram illustrating an example of how aggregate item demand for a particular search query is generated, and then allocated to the pages and listing slots of the search results pages, for purposes of determining which listings slots are to display item listings, and which are to display product listings, according to an embodiment of the invention.
Figure 5:
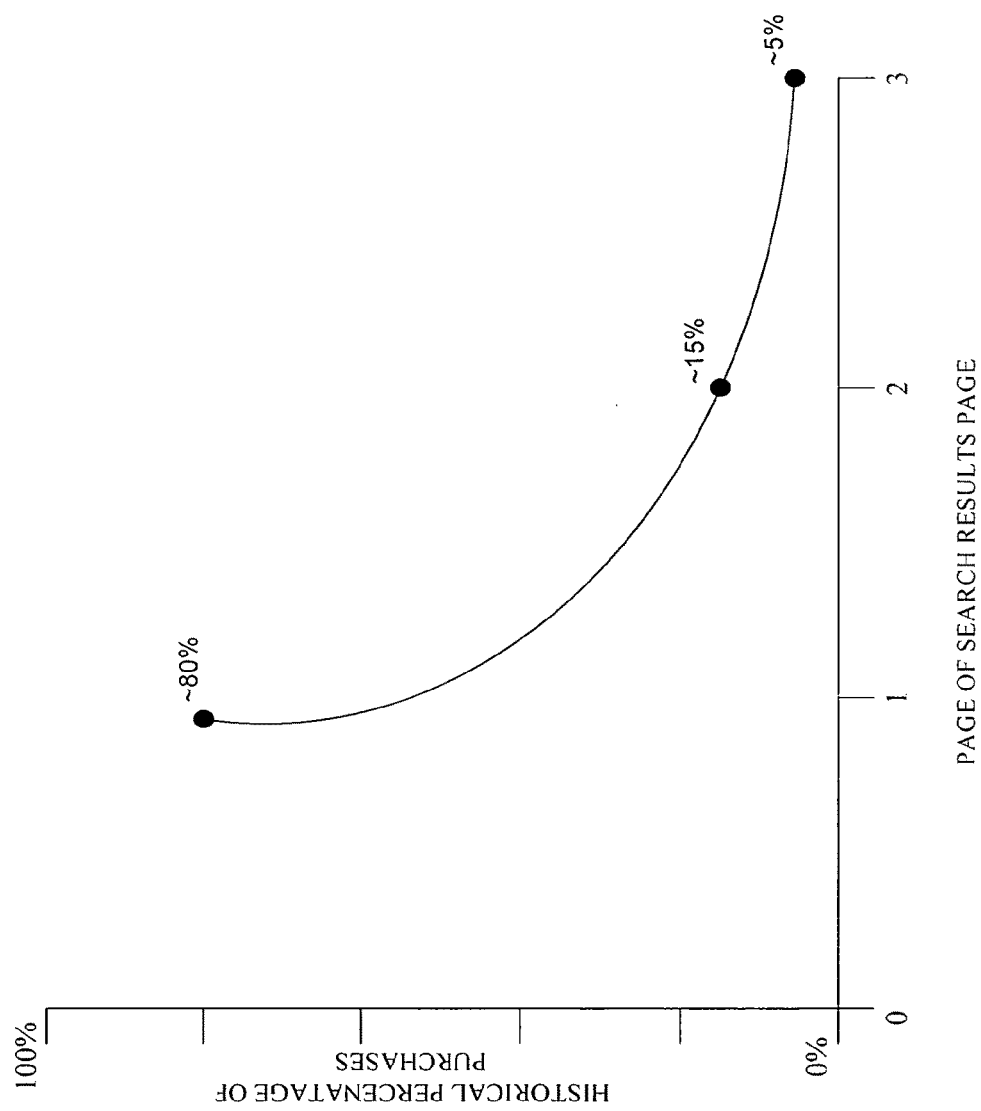
FIG. 5 is a chart illustrating the relationship between the historically observed percentage of purchases (or sales) and the page of the search results pages, which is used in allocating item demand, according to an embodiment of the invention.

Referring again to the example presented in FIG. 4, the aggregate demand for items 80 is allocated by the demand allocation module 60 to the three search results pages in accordance with the percent of purchases that each page represents according to an historical analysis of purchases. As such, in this example, the first search results page 82 is allocated sixty units of item demand, which represents eighty percent (the percent of purchases resulting from page one) of the seventy-five units of demand for the items. Similarly, the second search results page 84 is allocated a little more than eleven (11.25) units of item demand, based on the second page accounting for fifteen percent of purchases historically, and the third page 86 is allocated just under four (3.75) units of item demand.

Figure 6:
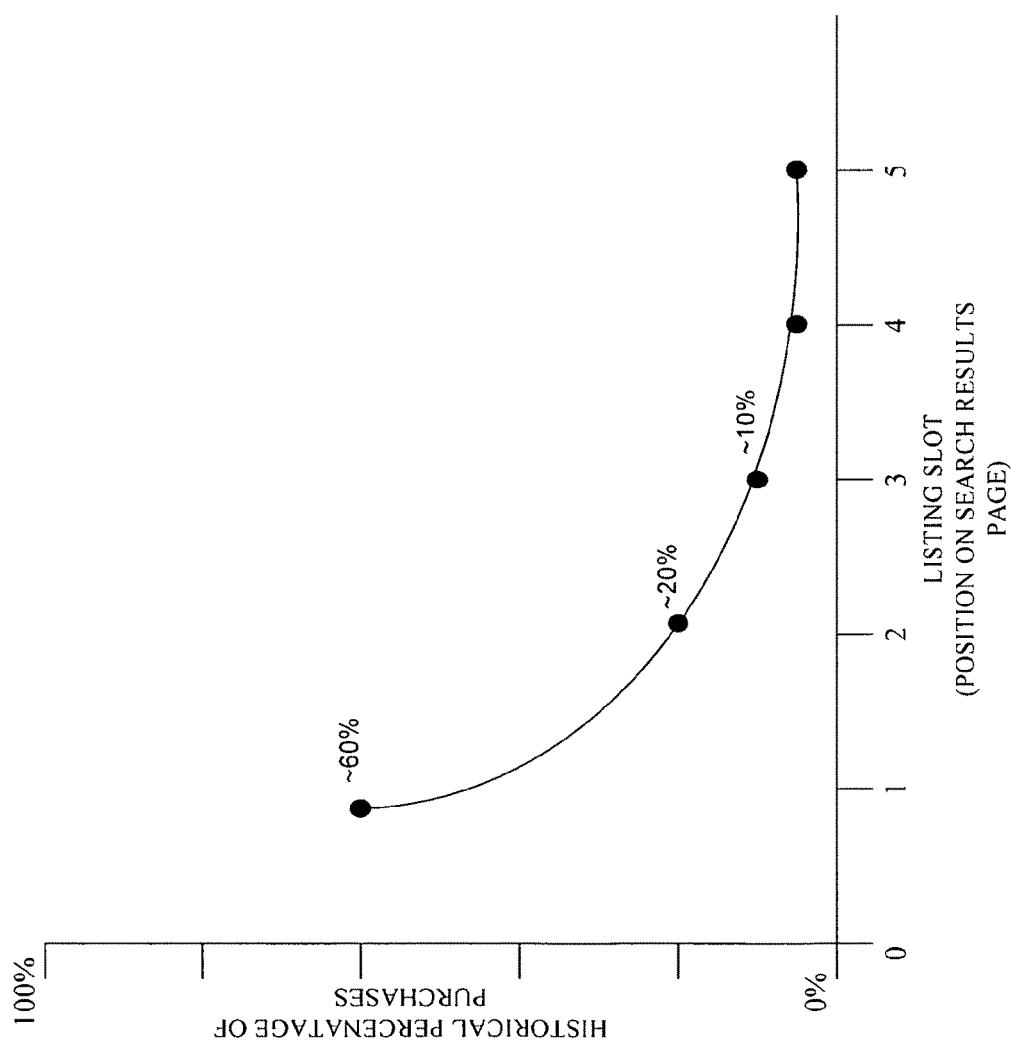
FIG. 6 is a chart illustrating the relationship between the historically observed percentage of purchases (or sales) and the listing slots of search results page, which is used in allocating item demand, according to an embodiment of the invention.
Figure 7:
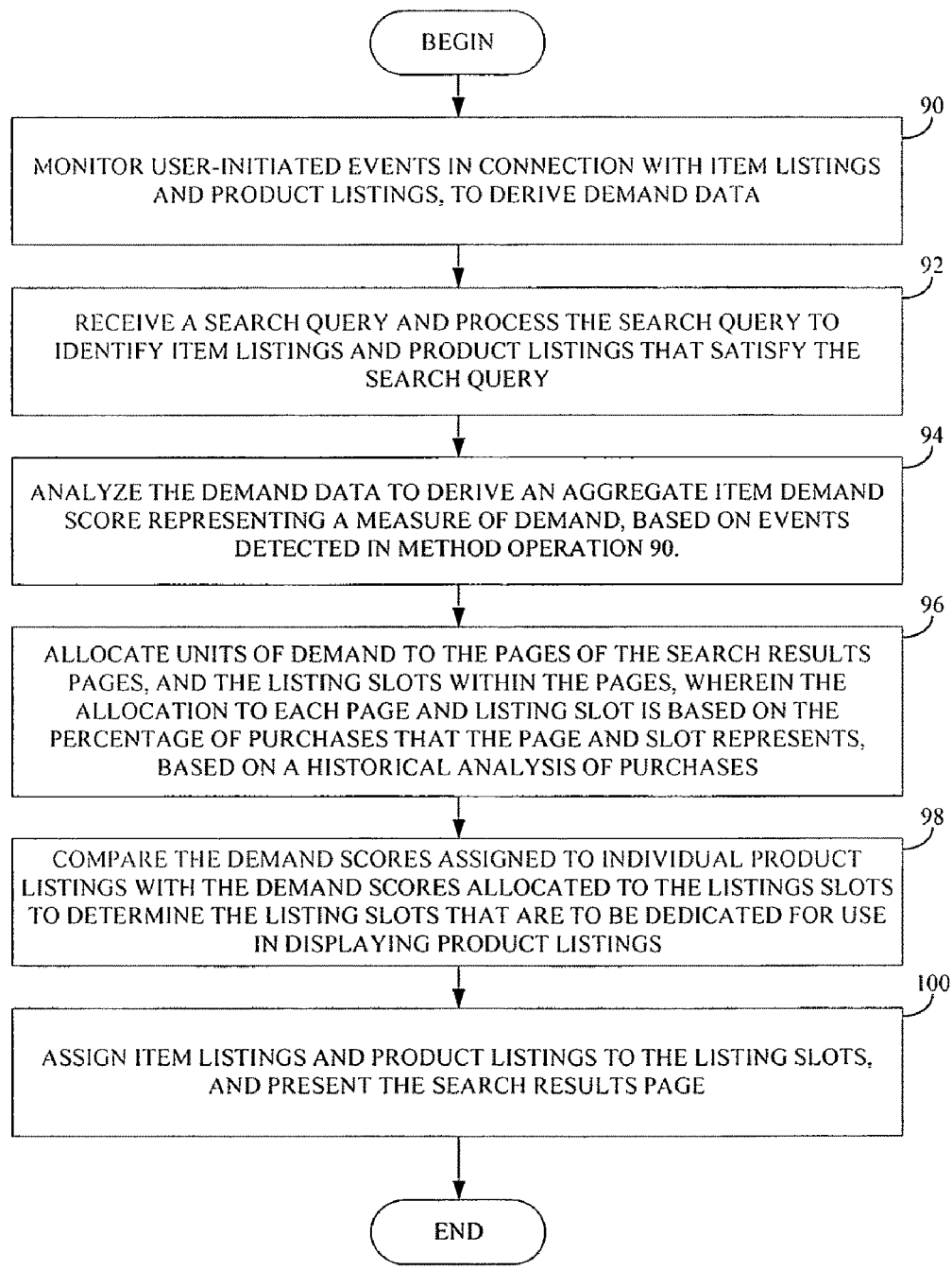
FIG. 7 is a flow diagram illustrating the method operations involved in a method for managing how heterogeneous listings satisfying a search query are processed and presented to a user of a computer-based trading or e-commerce application.

Next, the demand allocation module 60 allocates the portion of item demand for each search results page to the individual slots on the page, again, based on the percent of purchases that each listing slot represents according to an historical analysis of purchases. For example, in FIG. 6, a chart illustrates the historical percentage of demand attributable to each listing slot on a page. In various embodiments, different formulas might be used to allocate units of demand. For instance, in some embodiments, a curve such as that illustrated in FIG. 6 may be based on a power law formula, or deceleration or decay formula. In some embodiments, the particular numbers or formula used to allocate portions of item demand to listing slots may be configurable, such that an administrator of the e-commerce system can simply change a configuration setting to change the numbers, or formula, used in deriving the percentage of item demand allocated to each listing slot. Furthermore, it will be appreciated that the charts illustrated in FIGS. 5 and 6 are not necessarily accurate in terms of scale. As with the allocation operation for allocating item demand to the various pages in the search results pages, the allocation operation for allocating item demand to the individual listing slots may be configurable, such that an administrator of the system can simply modify a configuration setting to utilize a different set of numbers, or a different function or formula, for performing the allocation operation.

As with the allocation operation for allocation item demand to pages, in some embodiments, where the e-commerce platform serves as a back-end service to multiple web sites, the numbers used to allocate item demand to listings slots may be configurable on a per web site basis.

Returning now to the example of FIG. 4, the first listing slot 88 on the first page of search results 82 is allocated a total of thirty-six units of item demand, which represents sixty percent (60%) of the sixty units of item demand allocated to the first page of the search results. The first listing slot 88 is allocated sixty percent, as sixty percent represents the historically observed percentage of purchases that result from listings displayed in the first listing slot (as indicated in the chart in FIG. 6). Similarly, the second listing slot is allocated twelve units of item demand, and finally, the third listing slot is allocated six units of item demand.

Finally, the demand allocation module 60 compares the allocated units of item demand to the demand scores for the product listings to determine whether each listing slot should be dedicated for use in displaying an item listing or a product listing. In this example, the first listing slot is designated for use in displaying an item listing, as the allocation of item demand to the first listing slot, which is thirty-six, exceeds the highest demand score for a product listing, which in this example is product listing 1 (with reference number 74) with a demand score of fifteen. However, because product listing 1 has a demand score of fifteen, which exceeds the portion of item demand allocated to listing slot 2 with reference number 89, the second listing slot 89 is dedicated for use in displaying a product listing.

Referring again to FIG. 3, once the listing slots have been assigned a percentage of the aggregate demand for items and a comparison has been performed to establish whether each listing slot will be used for displaying an item listing or a product listing, the listing slot assignment module assigns the item listings and product listings that satisfy the query to the various listings slots. In some embodiments, the listings are assigned in order of their listing performance score, which is assigned to each listing by the ranking module 65. Accordingly, the item listing with the highest listing performance score is assigned to the first available listing slot designated for use in displaying an item listing. The item listing with the next highest listing performance score is then assigned to the next listing slot dedicated for use in displaying an item listing. Similarly, the product listing with the highest listing performance score is assigned to the first available listing slot dedicated for use in displaying a product listing. The listing performance score (sometimes referred to as a Best Match Score) that is assigned to each listing may be generated in accordance with any of the algorithms and systems described in related U.S. patent application Ser. No. 12/476,046, with title, "Methods and Systems for Deriving a Score with which Item Listings are Ordered when Presented in Search Results," filed on Jun. 1, 2009.

FIG. 6 is a flow diagram illustrating the method operations involved in a method for managing how heterogeneous listing types for listings satisfying a search query are processed and presented to a user of a computer-based trading or e-commerce application. The method begins at method operation 90 when user-initiated events are monitored and stored as demand data. For example, when users click on item listings and/or product listings, or, when users bid on items, purchase items, or add item listings to a watch list, these events are detected and demand data is captured and stored. This demand data is used to determine the position of product listings, relative to item listings in the search results pages.

Next, at method operation 92, a search query is received, and the search results satisfying the search query are identified. For example, a search engine module may process the search query to generate a search result set containing both item and product listings. At method operation 94, the demand data is analyzed to determine the total demand for the query, the demand associated with each product listing, and an aggregate demand for all item listings. The total demand for the query may be derived as a weighted sum of all user-initiated events associated with the item listings and product listings that satisfy the query, whereas the demand score assigned to each product listing may be derived as a weighted sum of events associated with that particular product listing. The aggregate demand for item listings may be derived by subtracting the aggregate product listing demand from the total demand associated with the query.

In any case, at method operation 96, the aggregate item listing demand is allocated to the individual pages, and listings slots, of the search results pages. The allocation is based on the percentage of purchases that each page and listing slot represents, based on an historical analysis of purchases. This allocation may be estimated or calculated, for example, using a power law formula, or some other formula that reflects the observed nature of the relationship between page and listing slot, and likelihood of purchase when displayed on such page and slot.

Once the aggregate demand for all item listings has been allocated to the individual listing slots, at method operation 98 a comparison is performed to identify the listing slots that should be dedicated for displaying product listings. For instance, the individual demand scores for the product listings are compared with the allocated portion of aggregate demand score for items, to determine the position of the particular listing slots that should be dedicated for use in displaying product listings.

Finally, at method operation 100, the item listings and product listings that satisfy the search query are assigned to the listing slots, such that the item listing with the highest listing performance score is assigned to the first listing slot that has been dedicated for use in displaying an item listing. The item listing with the next highest listing performance score is assigned to the next listing slot dedicated for use in displaying an item listing, and so on, until all of the item listings have been assigned to listings slots. Similarly, the product listing with the highest listing performance score is positioned in the first listing slot dedicated for use in displaying a product listing, and so forth, until all product listings have been assigned to listings slots.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 8:
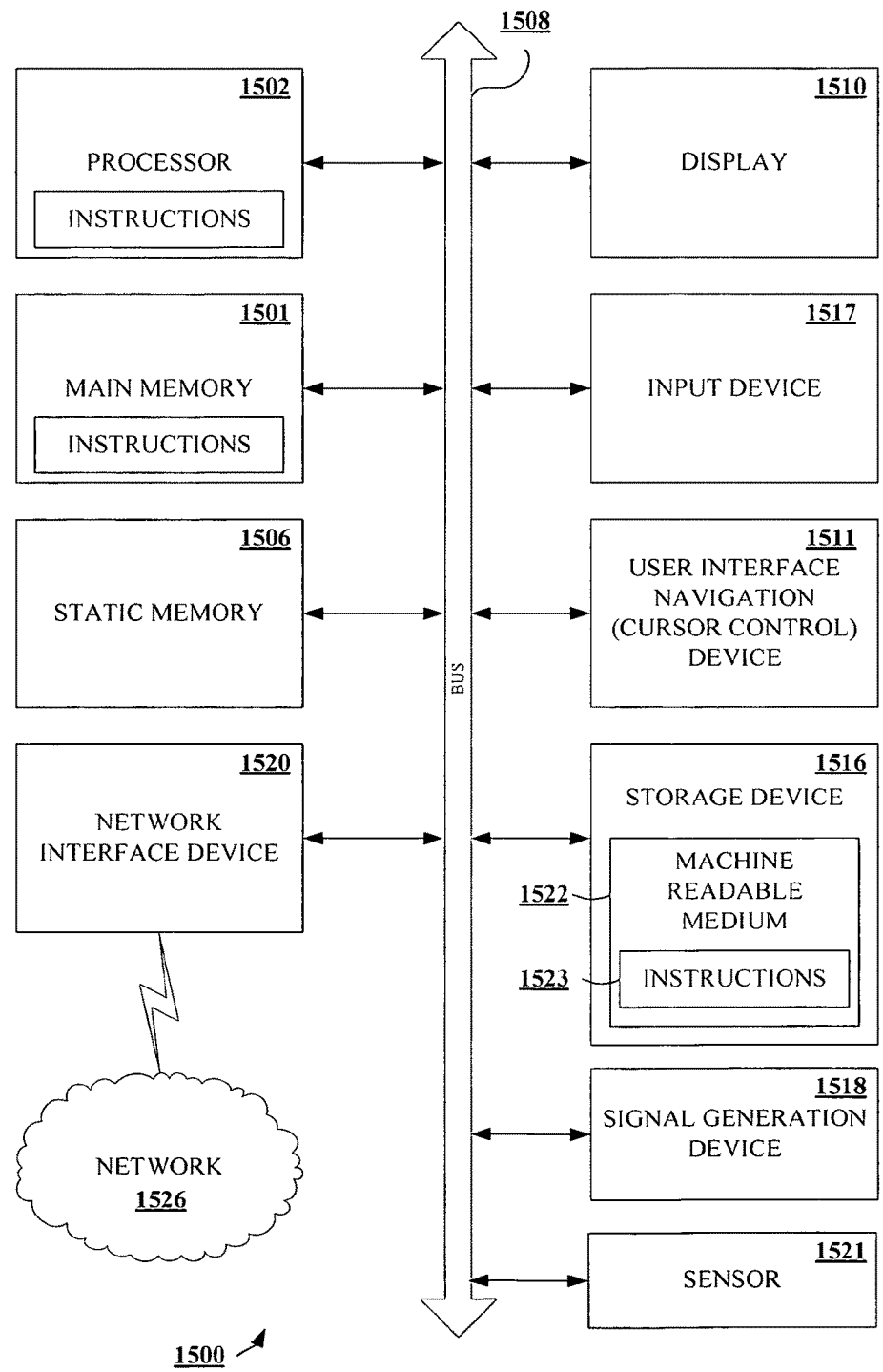
FIG. 8 is a block diagram of a machine in the form of a computer within which a set of instructions, for causing the machine to perform any one or more of the methodologies discussed herein, may be executed.

FIG. 8 is a block diagram of a machine in the form of a computer within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
   processing a query to identify item listings and product listings that satisfy the query;
   designating each listing slot in a search results page for use in displaying an item listing or a product listing that satisfies the query, the designation based on a comparison of a demand score for a particular product listing with a portion of an aggregated demand score for item listings that has been allocated to each listing slot based on the historically observed percent of purchases that each listing slot represents;
   displaying an item listing in each listing slot designated for use in displaying an item listing, the item listings presented relative to one another in an order that is based on a listing performance score assigned to each item listing; and
   displaying a product listing in each listing slot designated for use in displaying a product listing, the product listings presented relative to one another in an order based on a listing performance score assigned to each product listing.

2. The computer-implemented method of claim 1, wherein the demand data is derived by monitoring user-initiated events in connection with the item listings and the product listings, the user-initiated events including: item and product views, bids, purchases, and adding an item listing to a watch list.

3. The computer-implemented method of claim 1, wherein designating each listing slot in a search results page for use in displaying an item listing or a product listing that satisfies the query includes allocating to each page in a set of search results pages a portion of an aggregate demand score for the item listings, the portion of the aggregated demand score allocated to each page based on the historically observed percent of purchases that each page represents.

4. The computer-implemented method of claim 3, wherein the historically observed percent of purchases that each page represents is estimated using a power law formula.

5. The computer-implemented method of claim 3, wherein designating each listing slot in a search results page for use in displaying an item listing or a product listing that satisfies the query includes allocating to each listing slot in a particular page of a set of search results pages a portion of the aggregate demand score for the item listings, the portion of the aggregated demand score allocated to each listing slot based on the historically observed percent of purchases that each listing slot represents.

6. The computer-implemented method of claim 5, wherein the historically observed percent of purchases that each listing slot represents is estimated using a power law formula.

7. An e-commerce system, comprising:
   at least one processor; and
   a machine-readable medium in communication with the at least one processor, the machine readable medium storing a listing presentation management module that is executable by the at least one processor, the listing presentation management module being executed by the at least one processor to cause operations to be performed, the operations comprising:
   processing a query to identify item listings and product listings that satisfy the query;
   designating each listing slot in a search results page for use in displaying an item listing or a product listing that satisfies the query, the designation based on a comparison of a demand score for a particular product listing with a portion of an aggregated demand score for item listings that has been allocated to each listing slot based on the historically observed percent of purchases that each listing slot represents;
   displaying an item listing in each listing slot designated for use in displaying an item listing, the item listings presented relative to one another in an order that is based on a listing performance score assigned to each item listing; and
      displaying a product listing in each listing slot designated for use in displaying a product listing, the product listings presented relative to one another in an order based on a listing performance score assigned to each product listing.

8. The e-commerce system of claim 7, wherein the demand data is derived by monitoring user-initiated events in connection with the item listings and the product listings, the user-initiated events including: item and product views, bids, purchases, and adding an item listing to a watch list.

9. The e-commerce system of claim 7, wherein designating each listing slot in a search results page for use in displaying an item listing or a product listing that satisfies the query includes allocating to each page in a set of search results pages a portion of an aggregate demand score for the item listings, the portion of the aggregated demand score allocated to each page based on the historically observed percent of purchases that each page represents.

10. The e-commerce system of claim 9, wherein the historically observed percent of purchases that each page represents is estimated using a power law formula.

11. The e-commerce system of claim 9, wherein designating each listing slot in a search results page for use in displaying an item listing or a product listing that satisfies the query includes allocating to each listing slot in a particular page of a set of search results pages a portion of the aggregate demand score for the item listings, the portion of the aggregated demand score allocated to each listing slot based on the historically observed percent of purchases that each listing slot represents.

12. The e-commerce system of claim 11, wherein the historically observed percent of purchases that each listing slot represents is estimated using a power law formula.

13. A computer-implemented method comprising:
based on an analysis of demand data for a query or category selection, designating a percentage of listing slots in a search results page for use in displaying a listing of a first type relative to a listing of a second type, the percentage of listing slots based on the percentage of an aggregate demand score for listings of the first type relative to a total demand score for the query or category.

* * * * *

UNITED STATES PATENT AND TRADEMARK OFFICE
CERTIFICATE OF CORRECTION

PATENT NO. : 8,224,814 B2  
APPLICATION NO. : 12/578560  
DATED : July 17, 2012  
INVENTOR(S) : Olson et al.

Page 1 of 1

It is certified that error appears in the above-identified patent and that said Letters Patent is hereby corrected as shown below:

In the Drawings

On Sheet 5 of 8, in Figure 5, after "HISTORICAL", delete "PERCENATAGE", and insert --PERCENTAGE--, therefor On Sheet 6 of 8, in Figure 6, after "HISTORICAL", delete "PERCENATAGE", and insert --PERCENTAGE--, therefor In the Specification In column 1, line 21, delete ".)", and insert --).--, therefor In column 7, line 43, delete "patent application", and insert --Patent Application--, therefor In column 10, line 52, delete "patent application", and insert --Patent Application--, therefor In column 12, line 11, delete ".)", and insert --).--, therefor In column 13, line 15, after "Telephone", insert --Service--, therefor Signed and Sealed this  
Twenty-fifth Day of November, 2014

Michelle K. Lee  
*Deputy Director of the United States Patent and Trademark Office*